United States Patent [19]

Peters et al.

[11] 4,274,396
[45] Jun. 23, 1981

[54] STRUCTURAL SOLAR ENERGY COLLECTOR

[75] Inventors: Melville F. Peters, Livingston, N.J.; Walter T. Peters, Harbor Rd., East Dennis, Mass. 02641

[73] Assignees: Walter Todd Peters; Margot Elizabeth Peters, both of East Dennis, Mass.; Albert F. Kronman, Locust Valley, N.Y.

[21] Appl. No.: 69,623

[22] Filed: Aug. 24, 1979

Related U.S. Application Data

[63] Continuation-in-part of Ser. No. 901,581, May 1, 1978, abandoned.

[51] Int. Cl.³ .................................................. F24J 3/02
[52] U.S. Cl. ..................................... 126/438; 126/448
[58] Field of Search ............... 126/417, 450, 438, 439, 126/441, 448

[56] References Cited

U.S. PATENT DOCUMENTS

| 3,043,112 | 7/1962 | Head | 126/417 |
|---|---|---|---|
| 3,321,012 | 5/1967 | Hervey | 126/438 |
| 3,923,039 | 12/1975 | Falbel | 126/438 |
| 3,951,128 | 4/1976 | Schoenfelder | 126/438 |
| 3,974,824 | 8/1976 | Smith | 126/438 |
| 3,982,527 | 9/1976 | Cheng et al. | 126/438 |
| 3,986,490 | 10/1976 | Chao | 126/438 |
| 3,991,740 | 11/1976 | Rabl | 126/438 |
| 4,003,364 | 1/1977 | Backus | 126/438 |
| 4,006,731 | 2/1977 | Carroll | 126/450 |
| 4,007,729 | 2/1977 | Chaeo et al. | 126/439 |
| 4,015,585 | 4/1977 | Fattor | 126/438 |
| 4,059,093 | 11/1977 | Knowles et al. | 126/438 |
| 4,069,809 | 1/1978 | Strand | 126/449 |
| 4,088,116 | 5/1978 | Pastor | 126/439 |
| 4,114,592 | 9/1978 | Winston | 126/438 |
| 4,117,831 | 10/1978 | Bansal et al. | 126/448 |
| 4,129,115 | 12/1978 | Wyatt | 126/438 |

Primary Examiner—Daniel J. O'Connor
Attorney, Agent, or Firm—Albert F. Kronman

[57] ABSTRACT

The outer wall surfaces of a building are formed with spaced elongated recesses to receive radiant solar energy. Elongated fluid bearing lines are partially disposed within the recesses and incorporated into a continuous fluid circulating system. Solar energy is absorbed by the wall surfaces and also reflected by the sides of the recessed to heat the fluid bearing lines. The specific cross sectional shape of the recesses and the location of the fluid bearing lines is designed to provide the maximum efficiency of the collector at a given location.

5 Claims, 15 Drawing Figures

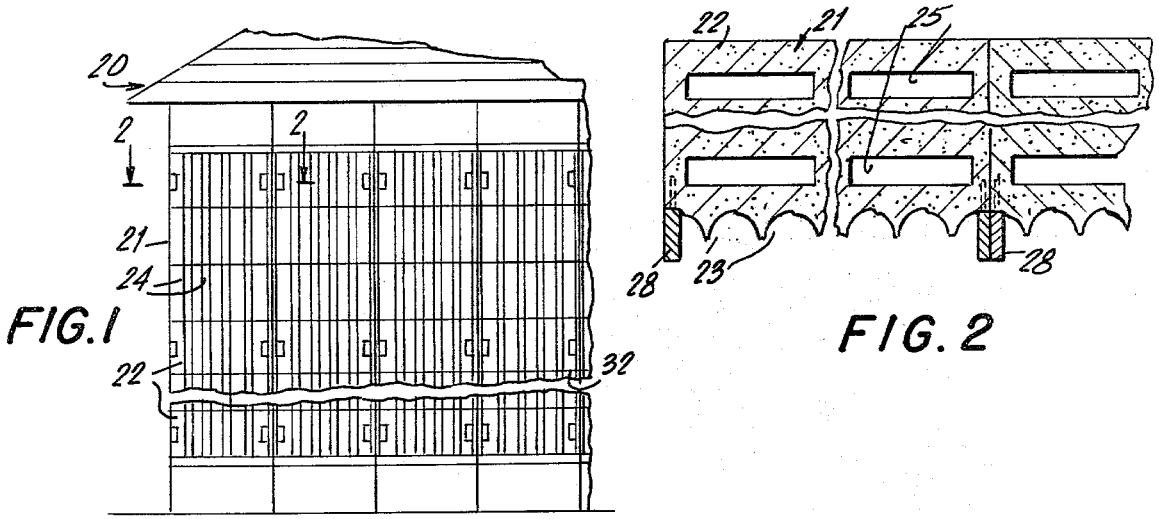
FIG. 1
FIG. 2
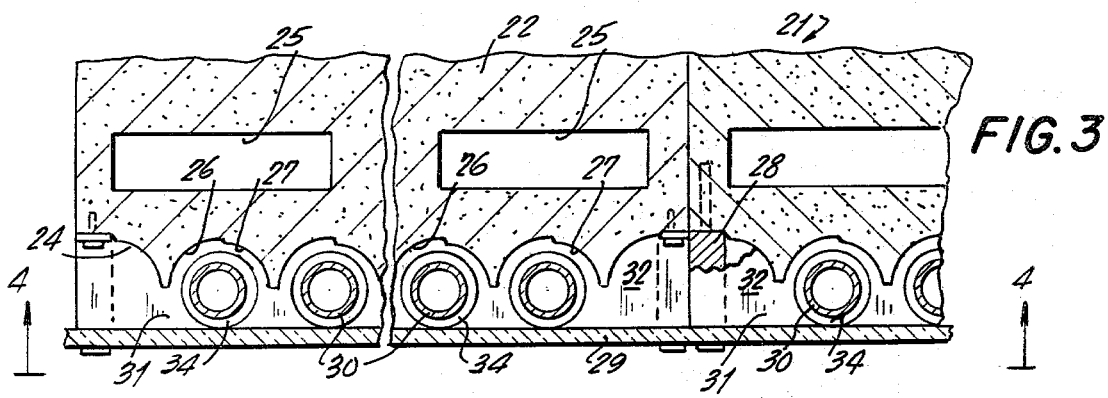
FIG. 3
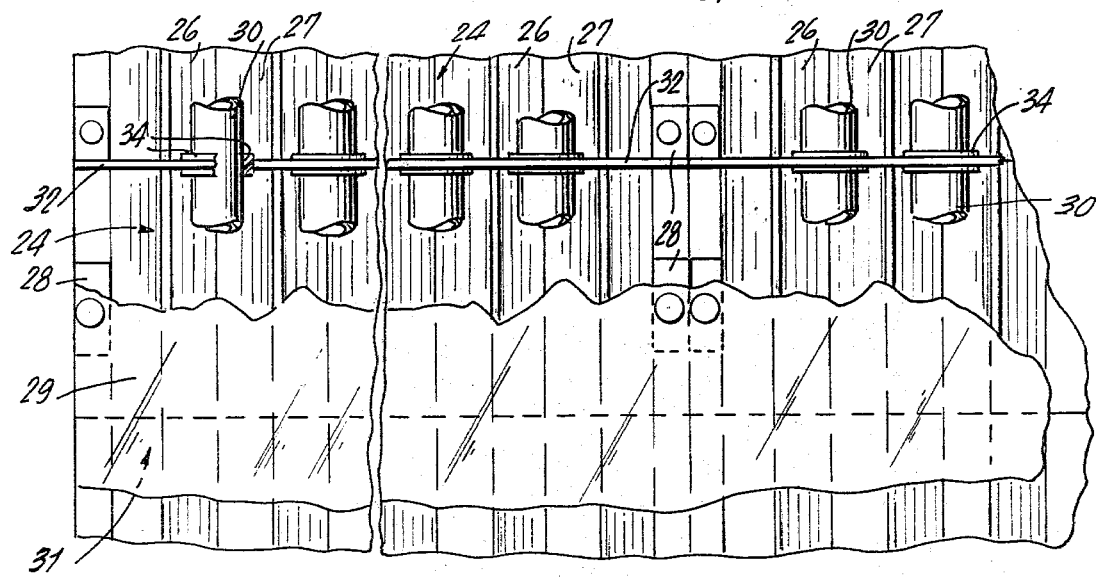
FIG. 4

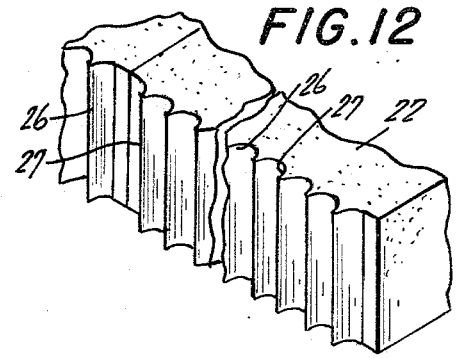
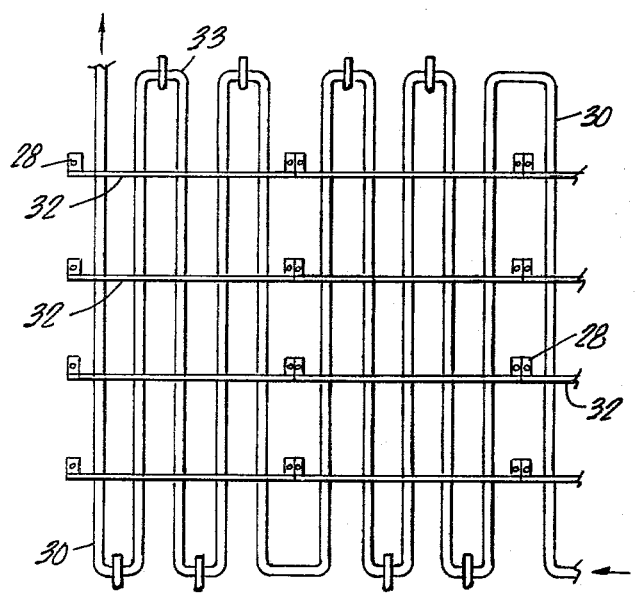
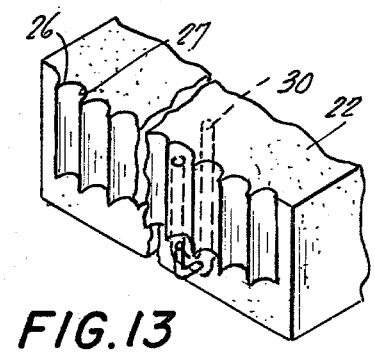
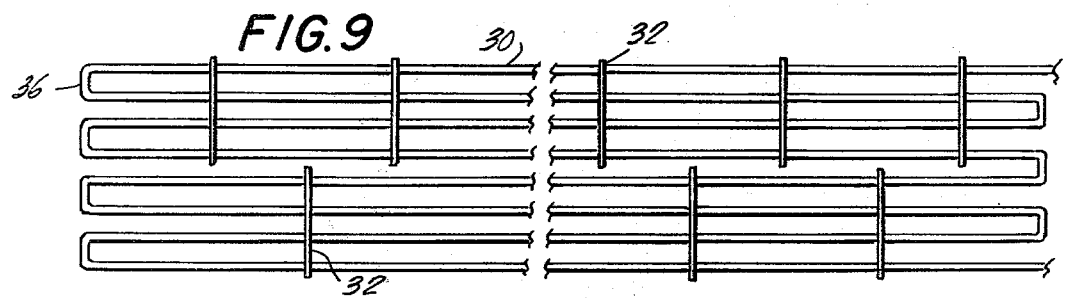
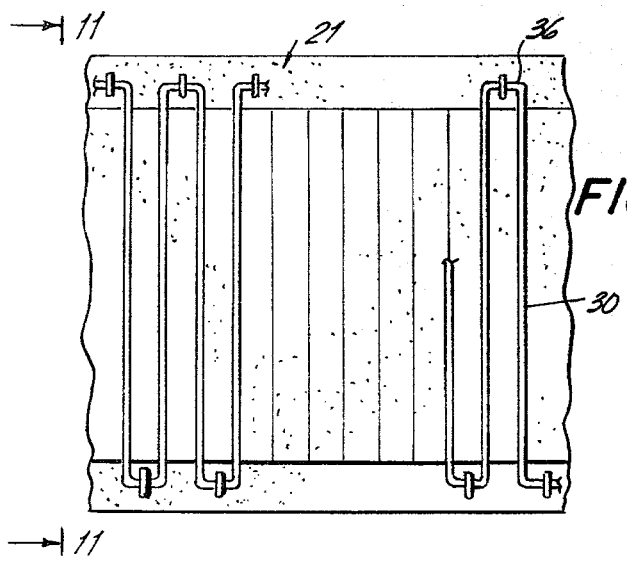
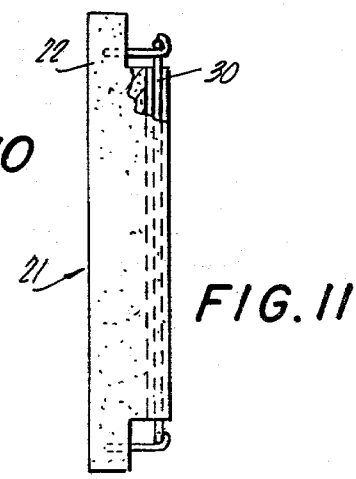

STRUCTURAL SOLAR ENERGY COLLECTOR

REFERENCE TO CO-PENDING APPLICATION

This application is a continuation-in-part of an application Ser. No. 901,581 filed May 1, 1978, now abandoned.

BACKGROUND OF THE INVENTION

Solar energy collectors which absorb radiant energy for subsequent heating purposes are well-known. Those most commonly employed consist of an array of panels in which a plurality of fluid bearing pipes or ducts absorb the radiant energy to warm the fluid. The warmed fluid is then circulated through a heat exchanger or storage unit for subsequent use. Many such panels are rotated by expensive mechanical means to follow the suns rays. Other are fixed to a roof or wall and are thus more limited in the number of hours they can function each day. It is customary to add these panels to an existing building structure as a later modification. Such installations are expensive and increase roof loads.

The efficiency of a solar panel system in a locality is determined by the percentage of energy available which is devoted to useful purposes. From an economic standpoint, the cost of the energy per Langely is determined by the cost of the abosorber plus upkeep. The thermal efficiency of the absorber can be computed in two ways, first, the ratio of the energy absorbed from the sun to the energy lost by conduction, convection and radiation, or by the ratio of the energy available to these losses. Since the angle of incidence of the solar energy will change during the day from sunrise to sunset, the percentage of energy which is devoted to useful purposes will be in direct relationship to the amount of such energy which can be converted by the structure of the panel.

In U.S. Pat. No. 3,951,128, there is shown a solar heat collector system incorporated into a roof or wall structure element having elongated elliptical or parabolic grooves therein. Flat elliptically shaped conduits are located above the parabolic grooves, which grooves are provided with reflective plates so that sunlight falling upon the collector system is directed upon the conduits and also upon the parabolic reflectors. The reflectors, in turn direct the reflected solar energy toward the conduits. In this prior art device, low angles of radiation incident upon the collector system will not be reflected onto the conduits and the percentage of energy which can be absorbed by the conduits is basically that which is received directly.

In still another prior art device, shown in U.S. Pat. No. 4,006,731, there is shown a roof structure in which parabolic reflectors are used to concentrate the sun's rays upon conduits located above them. However, these reflecting, surfaces are designed to compensate for sloping roofs and other architectural installations rather than to maximize the amount of solar energy received within the panel throughout the day.

It is therefore, an object of the present invention to provide solar energy collectors which are constructed as part of the exterior walls or roofs of buildings.

Another object of the present invention is to provide solar collectors which, while fixed in place, will absorb solar energy over a substantial portion of the day.

A further object of the present invention is to provide solar collectors in which the absorber-reflector structure is incorporated into conventional building materials, thereby reducing costs.

Still another object of the present invention is to provide structural building elements for exterior use which may subsequently serve as part of a solar energy collector.

SUMMARY

Solar energy collectors made according to the present invention comprise exterior building components into which there are incorporated a series of spaced elongated recesses. The recesses are of a cross sectional shape, such that the sun's rays will be received therein for the greater portion of the day. This shape is computed for the geographic latitude at which the collector is to be used. The sides of the recesses are made of, or coated with, light reflective material and a continuous system of fluid bearing lines is disposed within the recesses to receive the direct and reflected solar energy. The fluid is circulated through the lines which are part of a solar energy apparatus suitable to extract and use collected solar energy.

BRIEF DESCRIPTION OF THE DRAWINGS

In the accompanying drawings, forming part hereof similar elements have been given the same reference numerals, in which drawings;

FIG. 1 is a fragmentary view in side elevation of a building constructed in accordance with the present invention.

FIG. 2 is a cross sectional view, taken on line 2—2 in FIG. 1, somewhat enlarged.

FIG. 3 is a view similar to FIG. 2, further enlarged, showing the completed solar energy collector, comprising one embodiment of the present invention.

FIG. 4 is a view taken on line 4—4 in FIG. 3, partly broken away.

FIG. 8 is a view in front elevation showing a fluid line assembly, suitable for the practice of the present invention.

FIG. 9 is a view similar to FIG. 8 showing a horizontal fluid line assembly.

FIG. 10 is a fragmentary view in elevation illustrating the manner in which the fluid line assembly can be added to an exterior wall at a date subsequent to initial building.

FIG. 11 is a view taken on line 11—11 in FIG. 10, looking in the direction of the arrows.

FIG. 12 is a somewhat isometric fragmentary view of a portion of a building showing the radiant energy receiving recesses.

FIG. 13 is a view similar to FIG. 12 indicating in dashed lines the location of the fluid lines.

DETAILED DESCRIPTION OF THE INVENTION

Figure 5:
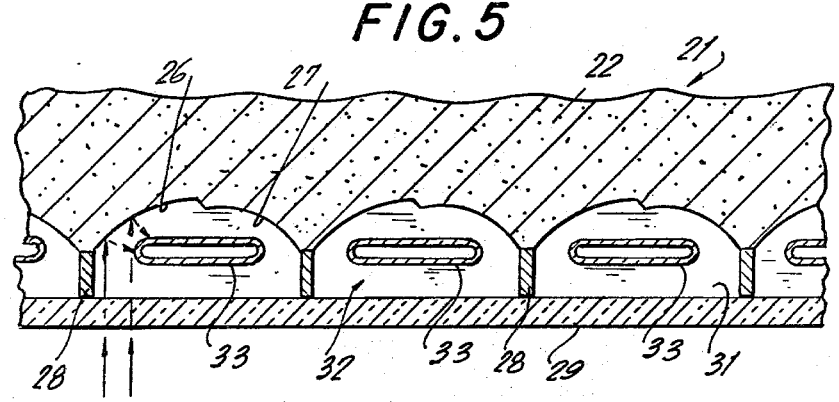
FIG. 5 is a fragmentary cross-sectional view of a second embodiment of the present invention.

Referring to the drawings and particularly FIGS. 1 and 2 there is shown a building structure 20 having masonry exterior walls 21. The walls 21 are illustrated as built up by cementing together a plurality of modular members in the nature of cement blocks 22. The blocks are provided on their outer faces with a series of parallel recesses 23 which when properly incorporated into a wall form a plurality of elongated recesses 24.

It is within the purview of the present invention, however, to employ precast concrete slabs having the same elongated recessed configuration. Other materials such as cinder block, brick or metal may also be used.

As shown in FIG. 2 the walls 21 are also provided with openings 25 which traverse the blocks 22 to form continuous ducts through which air may be circulated when desired or which may act as an insulator when the air therein is still.

As shown in FIG. 3, the sides of the recesses 24 are formed with a first arcuate surface 26 and a second arcuate surface 27. The arcuate surfaces are either made of or provided with a solar energy reflective material such as metal, plastic, glass mirrors or metallic particles sprayed on the surface. The precise shape of the arcuate reflectors 26, 27 will hereinafter be more fully described. The exterior ends of the cement blocks 22 are provided with spaced brackets 28 upon which there are held transparent outer cover members 29. The cover members may be made of glass, transparent plastic, or any such material through which infra-red or solar radiation will pass. The cover members 29 are for the purpose of keeping ambient air from cooling the interior of the solar panel. A series of fluid bearing lines 30 are carried within the elongated recesses 23 of the building structure and are preferably made of copper or some other suitable material. In addition, the fluid bearing lines 30 are coated with a dark solar energy absorbent coating such as black paint.

It will be seen from an examination of FIG. 3, that the fluid bearing lines 30 are located within the elongated recesses 23 but spaced from the bottoms thereof. The fluid bearing lines 30 are also spaced from the transparent cover members 29 so as to be disposed within a dead air space 31 between the exterior face of the blocks 22 and the outer cover members 29. Transverse spacers 32 (best shown in FIG. 4) in the form of flat transparent plates, which may also be made of plastic, are disposed transversely of the fluid bearing lines 30 within the dead air space 31 and serve both to support the fluid bearing lines 30 and to divide the dead air space 31 into a plurality of chambers through which air cannot circulate to cool the lines 30 heated by the transmission of solar radiation. Elastomer rings 34 on the spacers hold the lines 30 and support the cover members 29.

The fluid bearing lines 30 are connected into a continuous conduit by means of U-shaped portions 33 as shown in FIGS. 8, 9 and 10. In this manner fluid entering one end of the lines 30 can move continuously through the solar energy collector and be led either into a heat exchange unit or a heat storage unit.

In addition to heating fluid within the lines 30, radiant energy entering the collector will warm the air in the dead air space 31 and be transferred to the cement blocks 22. The hot cement blocks will in turn warm air within the openings 25 which form ducts through which the heated air may be circulated for heating purposes. The cement blocks, themselves, may serve as a heat sink to store solar energy and thereby warm the building.

It is preferred to have the elongated recesses 23 as shallow as possible and to have the fluid bearing lines 30 partially disposed therein so that the minimum amount of cement block strength is taken from the building structure 20 by reason of incorporating the solar energy collector therein. In addition, the transparent outer cover members 29 are kept close to the surfaces of the fluid bearing lines 30 without coming in contact therewith in order to prevent cold winds from taking heat out of the solar energy collector during the winter.

Figure 6:
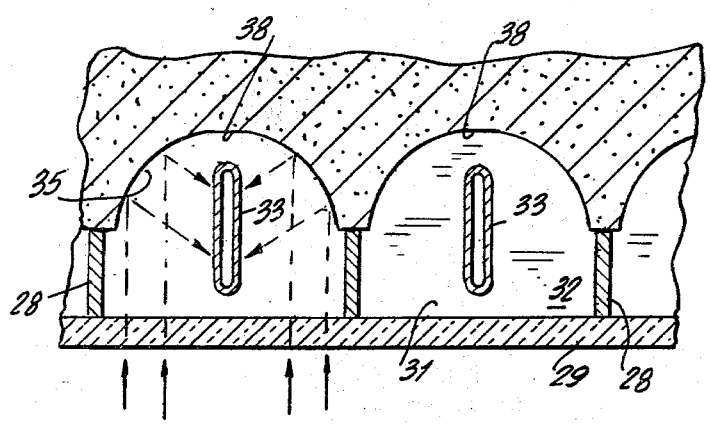
FIG. 6 is a fragmentary cross-sectional view showing a third embodiment of the present invention.

The thickness of the solar energy collector may also be reduced by employing elliptically shaped fluid bearing lines 33 as shown in FIG. 5. Where thickness of the building wall can accomodate deeper elongated recesses, the elliptical fluid bearing lines 33 may be disposed normal to the outer surface of the building as shown in FIG. 6. This configuration results in more reflected radiant energy being directed upon the fluid bearing lines as indicated by the arrows in FIG. 6.

Since the support for the solar energy collector, the recesses to receive the fluid bearing lines 30 and even the shape of the reflective surfaces are all part of the building structure the only additional cost for this substantial portion of the collector is that of manufacturing cement blocks or cast slabs having the desired recess shapes therein. Such manufacture, however, is not difficult and is compatible with the technology in the construction industry where a large variety of ornamental cast blocks and panels have been produced. The building structure, moreover, is not limited to vertical elongated recesses 23 but may use horizontal recesses to receive fluid bearing lines 30 as shown in FIG. 9. Other architectural designs are possible without departing from the spirit of the invention.

If desired, the elongated recess structure can be completed as an architectural design feature which will provide the option of installing solar energy collectors at a later date.

It will be seen from an examination of FIGS. 2, 3, 5, 7 and 14 that the first and second arcuate reflectors 26, 27 may vary in cross sectional shape. In determining the spacing of the fluid bearing lines 30 and the shapes of the reflecting surfaces in a fixed solar energy absorber which uses both direct ray absorption and reflection of the radiant energy, it is necessary to consider the latitude of the building site, in some instances the elevation of the building site and to plot the relative time intervals between sunrise and noon and between noon and sunset.

The radius of curvature of the reflectors, their center of curvature, the position and distance between the fluid bearing pipes and the distance of the transparent cover members from the pipes are all related to the latitude of the station and the time of day.

Having selected the station, the distribution of energy versus time, the angular position of the sun can be measured from sunrise to sunset. Hourly measurements of the radiation will give the values listed in curve 1 of FIG. 15 and the angle at which these measurements were made. Multiplying the energy of the suns rays by the angle of incidence "i" at each indicated angle will give the energy transmitted through the cover member and is the energy which impinges on the collector as illustrated by curve 2 in FIG. 15.

The position of the two cut off points A, B, on curve 2 can be calculated by computing the energy which would impinge on the collector for a series of time intervals. By dividing this energy by the cost of constructing a collector to span this time interval, a time interval can be selected which is justified in terms of cost per unit of energy. Two such time intervals and the energy at which it is not economically feasible to recover are shown by the two darkened areas in the FIG. 15, where $i_r = 60°$ the angle of incidence after sunrise and $i_s = 64°$, the angle of incidence before sunset.

An analysis of the problem provides the dimensions and arrangement of the collector in terms of the radius r of the fluid bearing tubes as follows; (see FIG. 7).

The center of curvature which is indicated by the x and y axis is, $$x = r(\sin i_r - \sin i_s)/\sin(i_r + i_s)$$

$$y = r(\sin(i_r+i_s) - \cos i_r(\sin i_r - \sin i_s)\sin i_r \sin(i_r+i_s)$$

The curvature $R_m$ of the reflector on the sun side of the collector is, $$R_m^1 = r(\sin(i_r+i_s) - \cos i_r(\sin i_r - \sin i_s)\sin i_r \cos i_r / \sin(i_r+i_s)$$

The curvature $R_m^2$ of the reflector on the sunset of the collector is $$R_m^2 = r(\sin(i_r+i_s) + \cos i_s(\sin i_r - \sin i_s)\sin i_s \cos i_s / \sin(i_r+i_s)$$

The distance D between the fluid bearing lines 30 is, $$D = R_m 1 \sin i_r + R_m^2 \sin i_s$$

Since the transparent cover member 29 overlies the x and y coordinates the inner surface of the window will be y units above the center of the tube and the center of the fluid bearing tube will be parallel to the X axis.

When the angle of incidence $i_r$ of the sun after sunrise equals the angle of incidence $i_s$ before sunset, the tube is centrally located. When $i_r > i_s$ the tube is to the left of the central axis and when $i_r < i_s$ the tube is to the right of the central axis.

An inspection of the two curves shows that less radiation is received by the absorber from sunrise to noon than from noon to sunset. This means that the reflecting surfaces should not be symmetrical with respect to the noon hour.

In order to design a collector which will absorb the maximum number of Langleys from the sun's radiation at a minimum cost per Langley during the winter months at Madison, Wis . U.S.A. a computation will be made from the data of curve No. 2.

Figure 7:
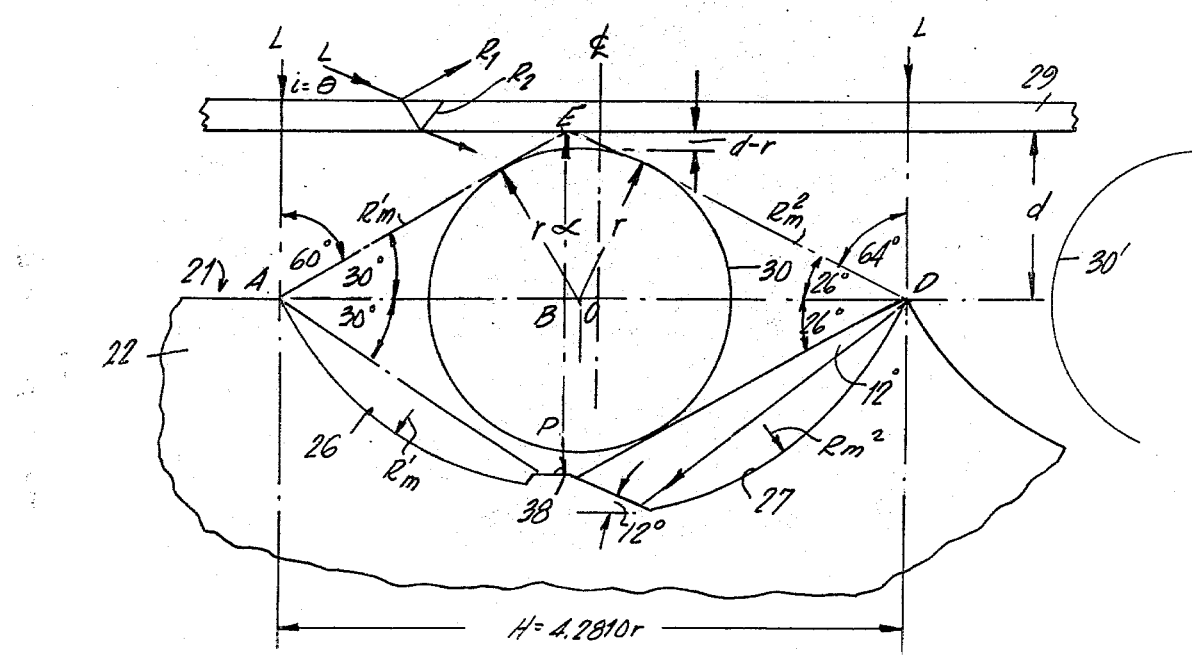
FIG. 7 is a cross-sectional diagrammatic view, somewhat enlarged showing still another embodiment of the present invention.
Figure 14:
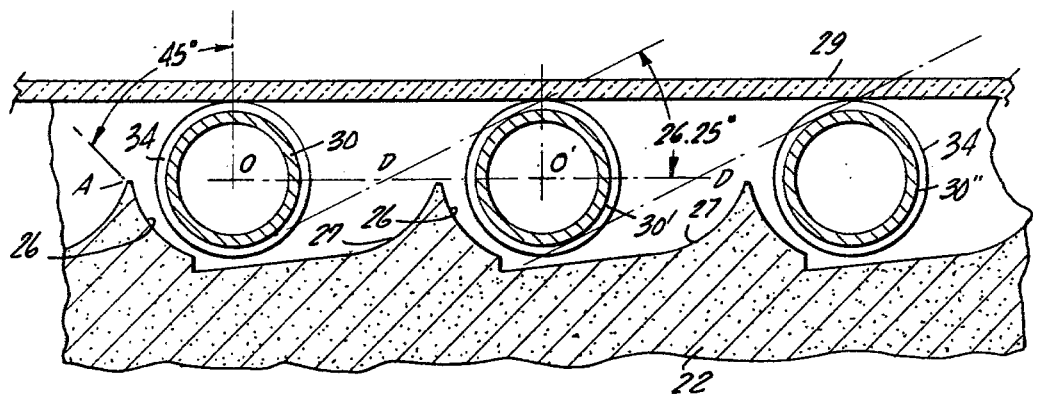
FIG. 14 is a fragmentary cross-sectional view of a solar energy collector made in accordance with the present invention showing another recess cross-sectional shape suitable for latitudes where the distribution of solar energy is different before and after noon.
Figure 15:
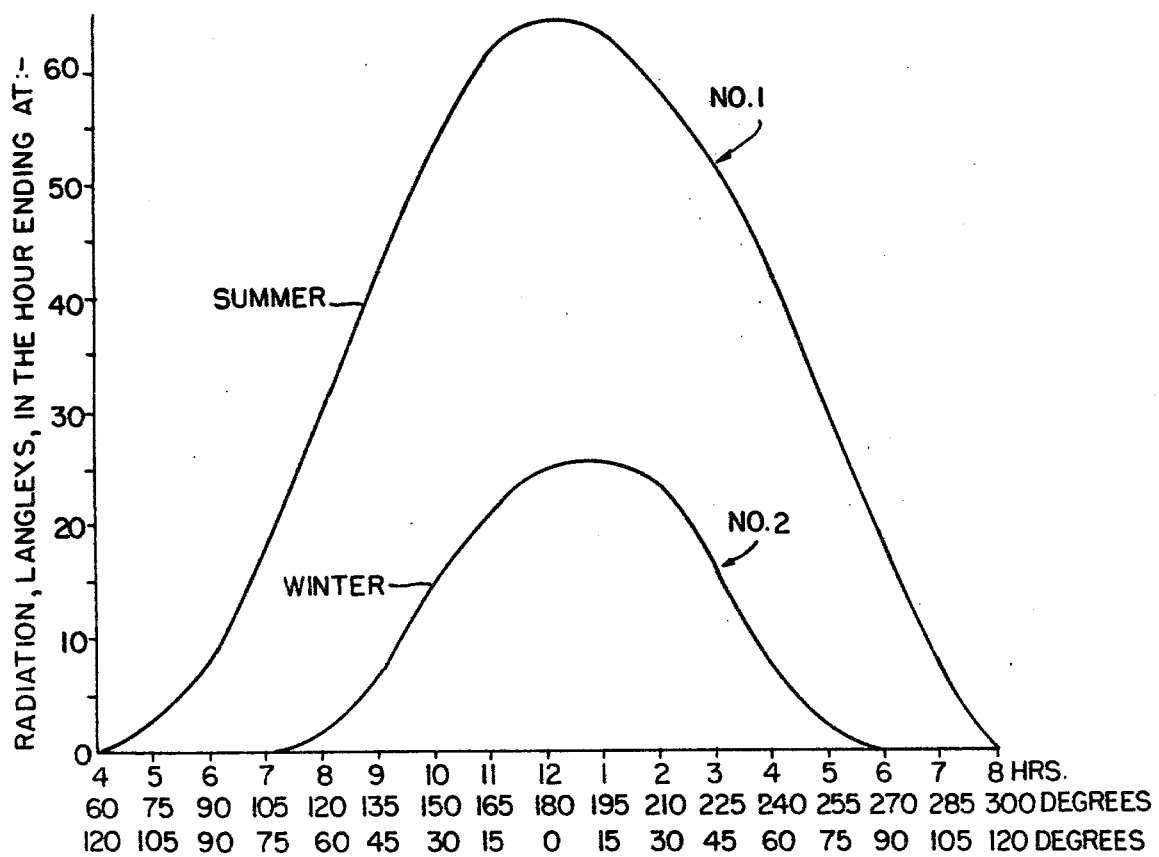
FIG. 15 is a graph showing the radiation, Langleys at different hours of the day at the latitude of Madison, Wis. and at two different times of the year, by way of illustration.

The solar energy absorber in FIG. 7 is based upon energy curve No. 2 in FIG. 15 where the angle of incidence after sunrise $i - 60°$ and before sunset $i - 64°$. Referring to the Figure, ∠EAB = ∠PAB = 30°
∠EDO = ∠PDO = 26°
ABO = r/sin 30° = 2r
OD = r/sin 26° = r/0.4384 = 2.2810r $$BO = r\left(\frac{1}{\sin 26°} - \frac{1}{\sin 30°}\right) = r(2.2810 - 2) = 0.2810r$$

BD = BO + OD = (0.2810 + 2.2810)r = 2.5620r
d = BD tan 26° = 2.5620r × 0.4877r = 1.2496r
$R^1m$ = AE = d/sin 30° = 2d
$R^2m$ = DE = d/sin 26° = d/0.4384 = 2.2810d.
H = AB + BO + OD = 2r + 2.2810r = 4.2810r which is also the distance between the centers of tubes 30,30'.

A flat reflective surface 38 is, between mirrors 26 and 27.

Having thus fully described the invention, what is claimed and desired to be secured by Letters Patent is:

1. A structural solar energy collector for a building comprising at least one outer surface a series of spaced elongated recesses in the outer wall, a first and a second elongated arcuate solar light reflecting member longitudinally disposed within the recesses, a fluid bearing line assembly including a plurality of elongated tubes supported upon the outer wall and disposed at least partially within the spaced elongated recesses to receive solar energy coming from the light reflecting surfaces, said tubes being disposed along the center of curvature of the arcuate solar reflecting surfaces, a solar energy transmitting cover member overlying the fluid bearing lines and means to interconnect the fluid bearing lines into a continuous circulating heat transfer system in which the said first arcuate reflecting member has a radius of curvature of:

$$R^1m = r(\sin(i_r+i_s) - \cos i_r(\sin i_r - \sin i_s)/\sin i_r \cos i_r / \sin(i_r+i_s)$$

and the said second arcuate reflecting member has a radius of curvature of:

$$R^2m = r(\sin(i_r+i_s) + \cos i_s(\sin i_r - \sin i_s)/\sin i_s \cos i_s / \sin(i_r+i_s)$$

where $R^1m$ is the radius of the reflecting member on the sun rise side of the arcuate reflector, $R^2m$ is the radius of the reflecting member on the sun set side of the arcuate reflector, r is the radius of the fluid bearing tubes, $i_r$ is the angle of incidence of solar rays after sun rise, $i_s$ is the angle of incidence of solar rays before sun set.

2. A collector according to claim 1 in which the distance D between the fluid bearing tubes is:

$$D = R^1m \sin i_r + R^2m \sin i_s$$

3. A collector according to claim 1 in which the recesses are symmetrical in cross sectional shape about the fluid bearing line.

4. A collector according to claim 1 in which the recesses comprising a first and a second solar reflecting member, are assymetrical in cross sectional shape and are spaced from the fluid bearing line.

5. A collector according to claim 1 in which the fluid bearing lines are non-circular in cross section.

* * * * *